No. 708,697.　　　　　　　　　　　　　　Patented Sept. 9, 1902.
T. DEAKIN.
ENGINE.
(Application filed Dec. 5, 1901.)
(No Model.)　　　　　　　　　　　　　　　　8 Sheets—Sheet 4.
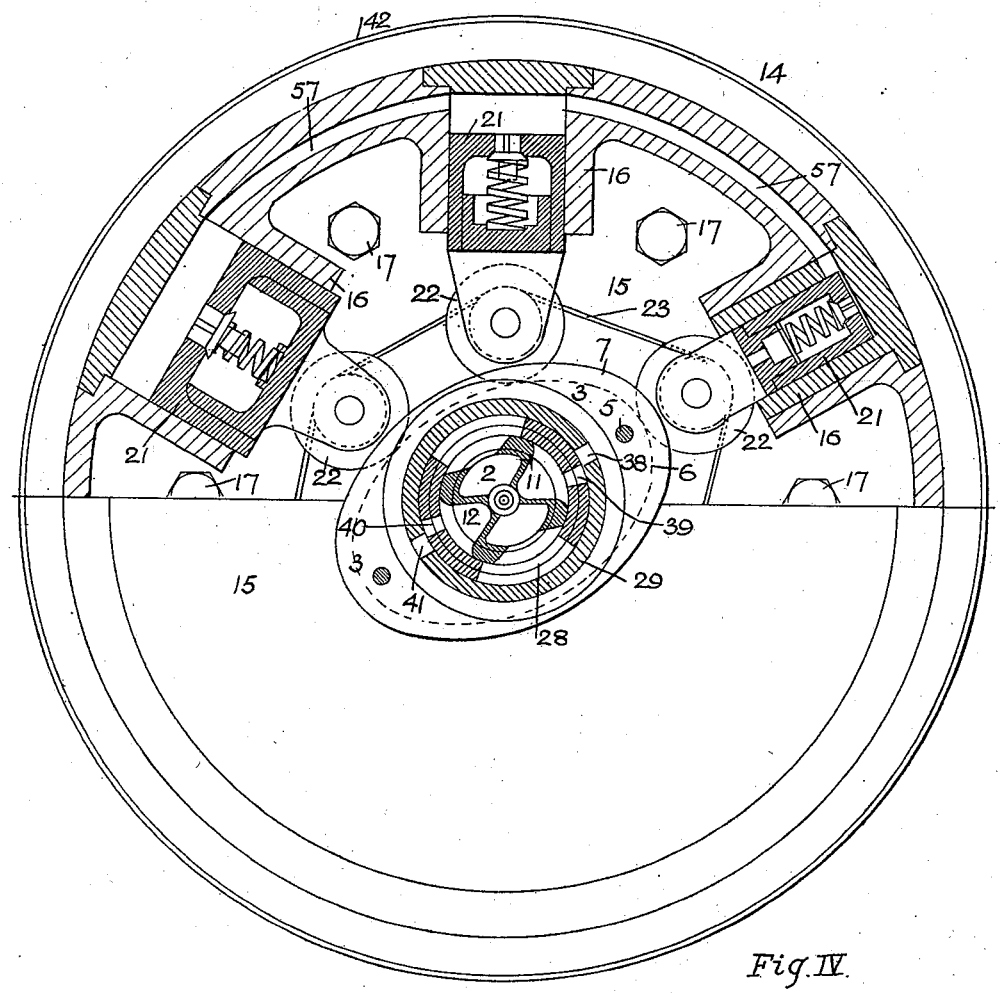
Fig. IV.
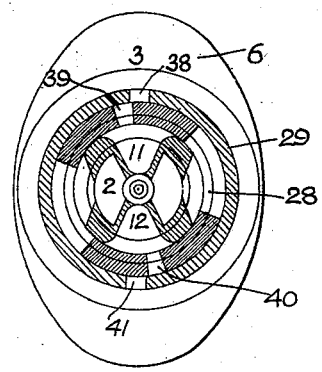
Fig. V.
Witnesses.
John T. Fazakarley.
Thos. F. Wilson.
Inventor.
Thomas Deakin
per Douglas Leechman.
Attorney
THE NORRIS PETERS CO., PHOTO-LITHO., WASHINGTON, D. C.

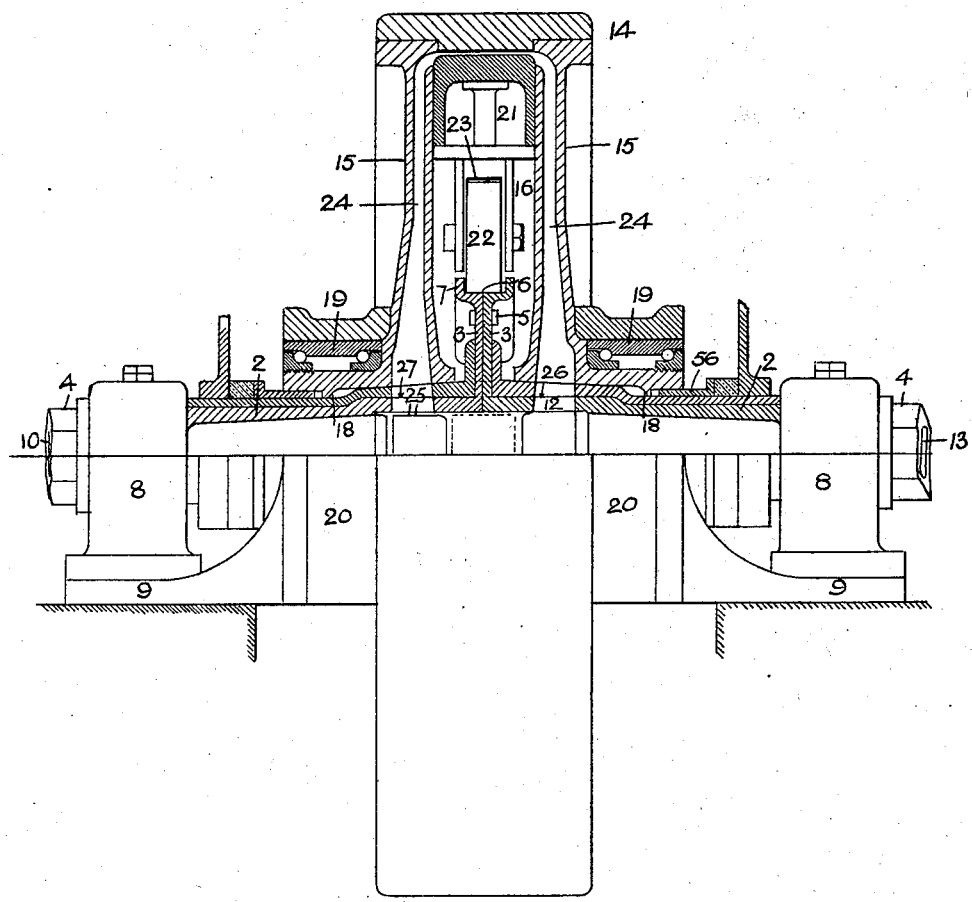
Fig. I.

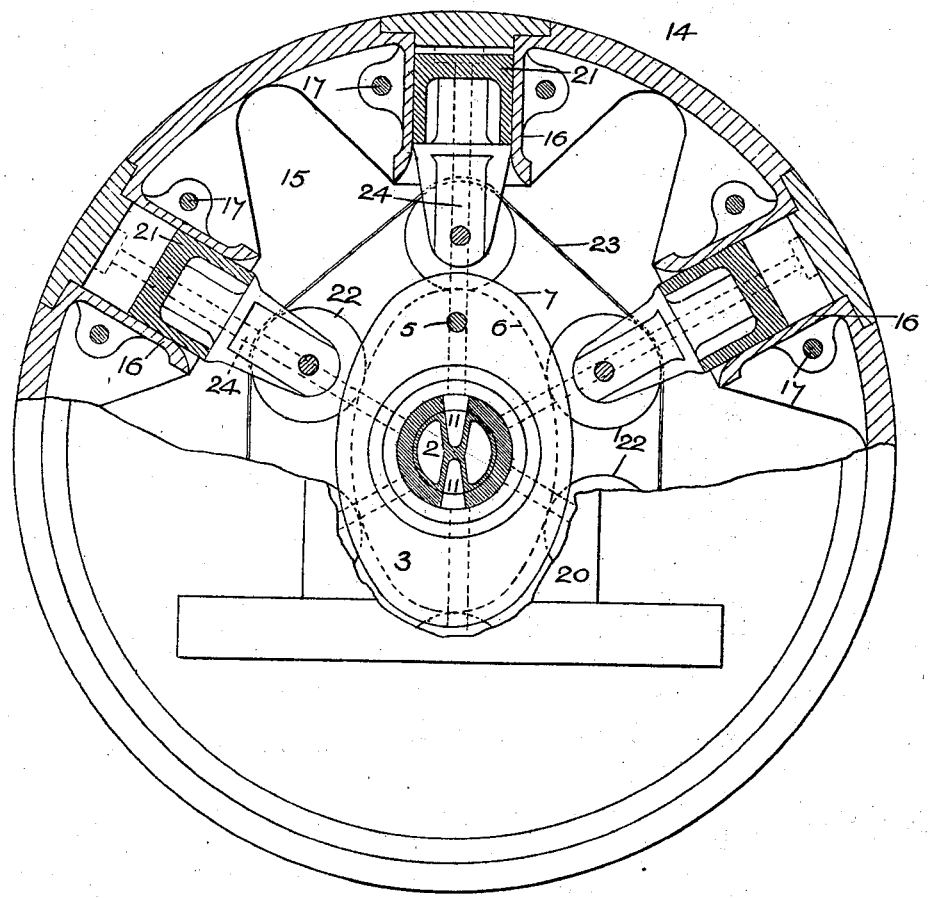
Fig. II.

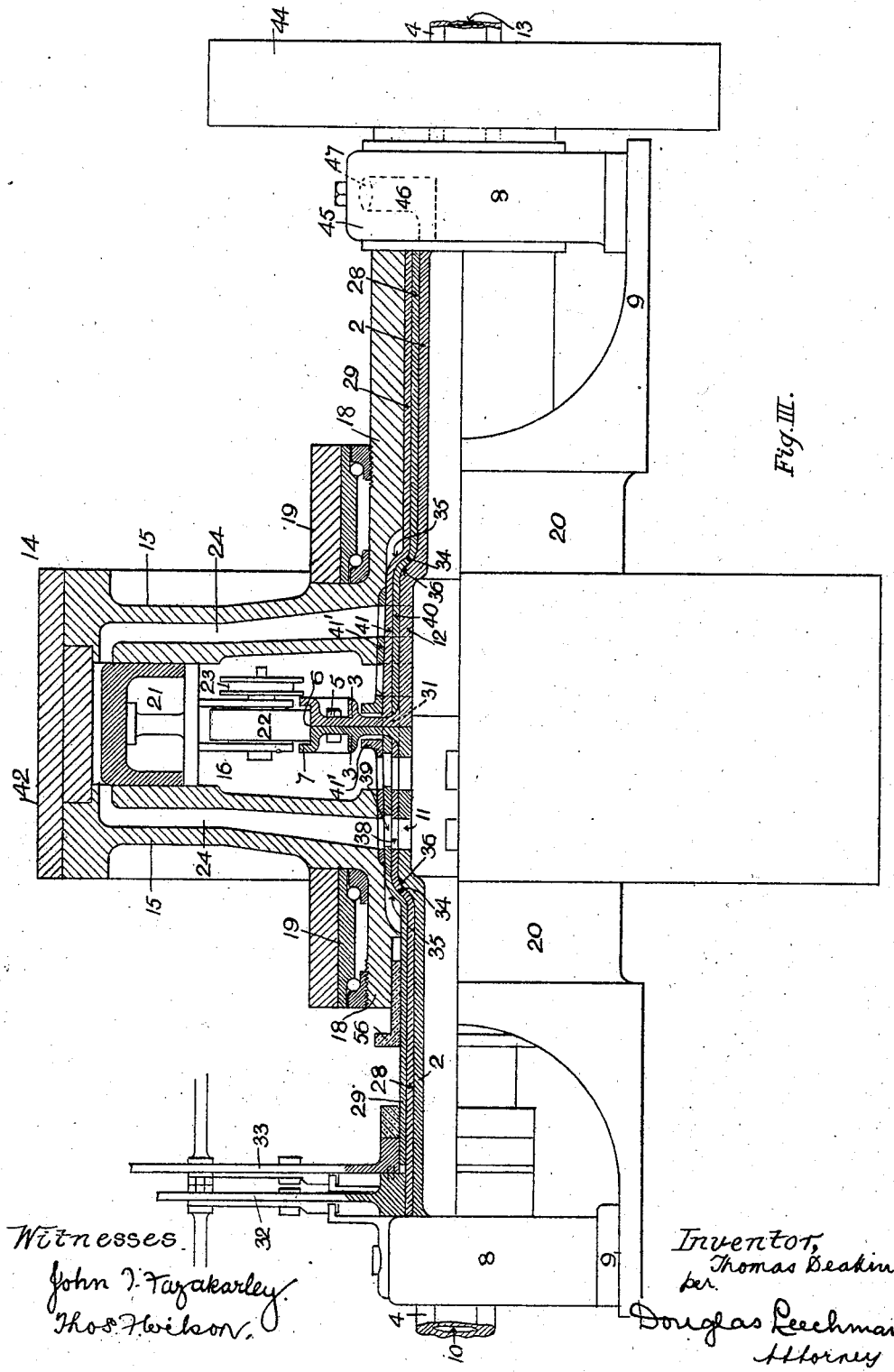

No. 708,697. Patented Sept. 9, 1902.
T. DEAKIN.
ENGINE.
(Application filed Dec. 5, 1901.)
(No Model.) 8 Sheets—Sheet 5.
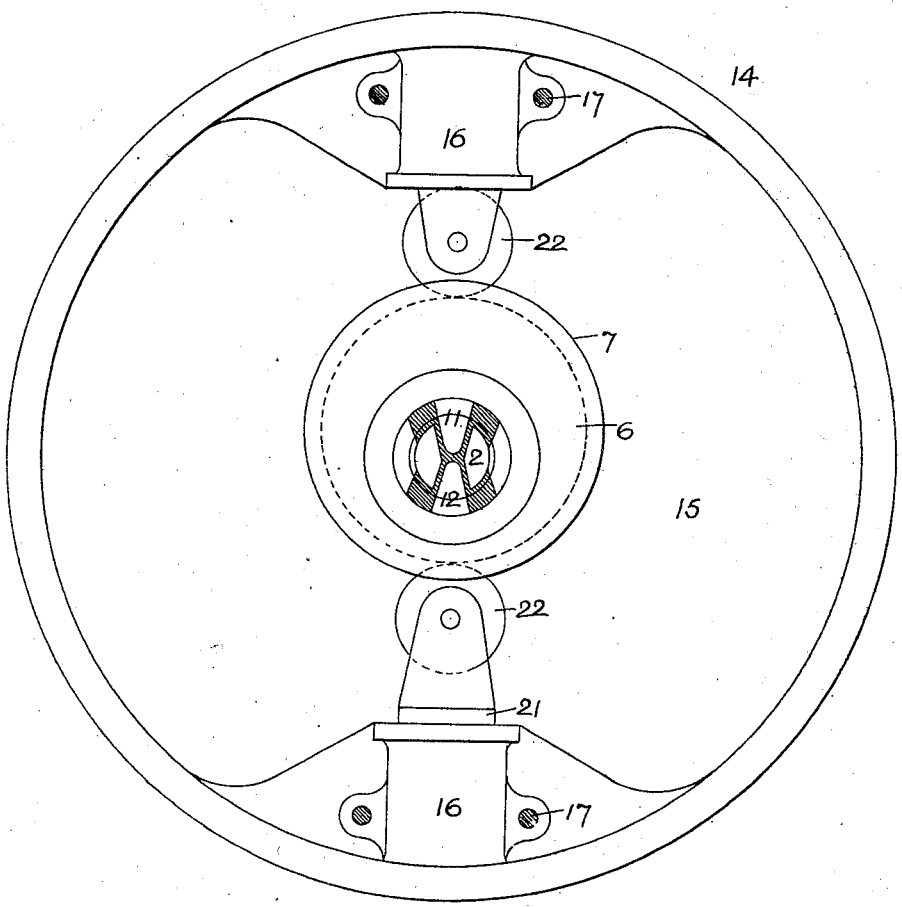
Fig. VI.
Witnesses
John J. Fazakarley
Thos. F. Wilson
Inventor,
Thomas Deakin.
per,
Douglas Leechman.
Attorney.

No. 708,697. Patented Sept. 9, 1902.
T. DEAKIN.
ENGINE.
(Application filed Dec. 5, 1901.)
(No Model.) 8 Sheets—Sheet 6.
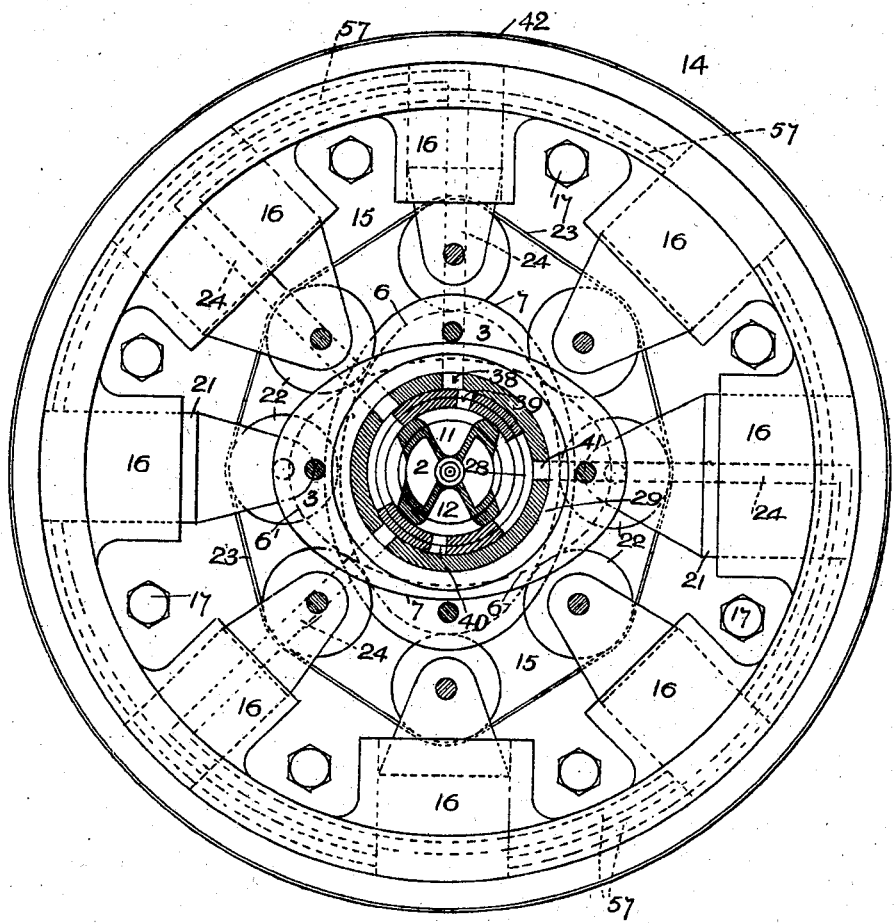
Fig. VII.
Witnesses, Inventor,
John T. Fazakarley Thomas Deakin,
Thos. F. Wilson. per
Douglas Leechman.
Attorney.

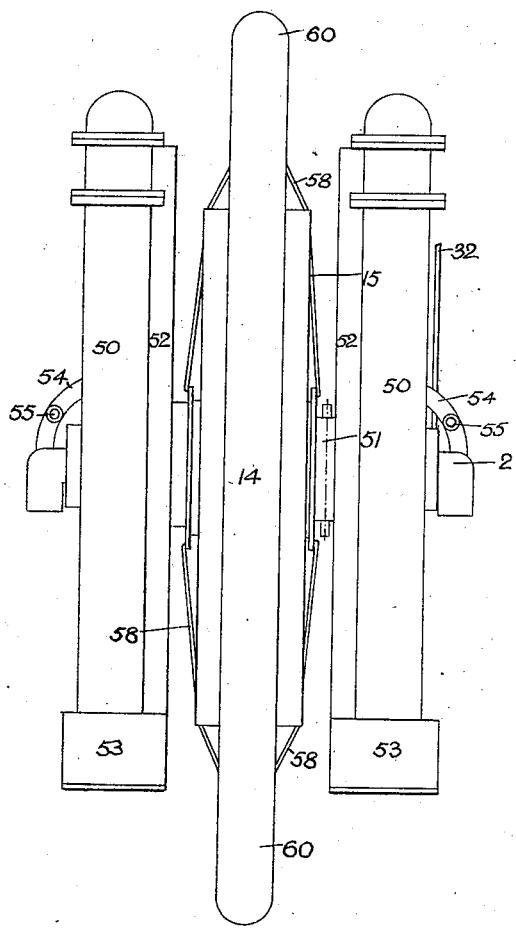
Fig. VIII.

No. 708,697. Patented Sept. 9, 1902.
T. DEAKIN.
ENGINE.
(Application filed Dec. 5, 1901.)
(No Model.) 8 Sheets—Sheet 8.
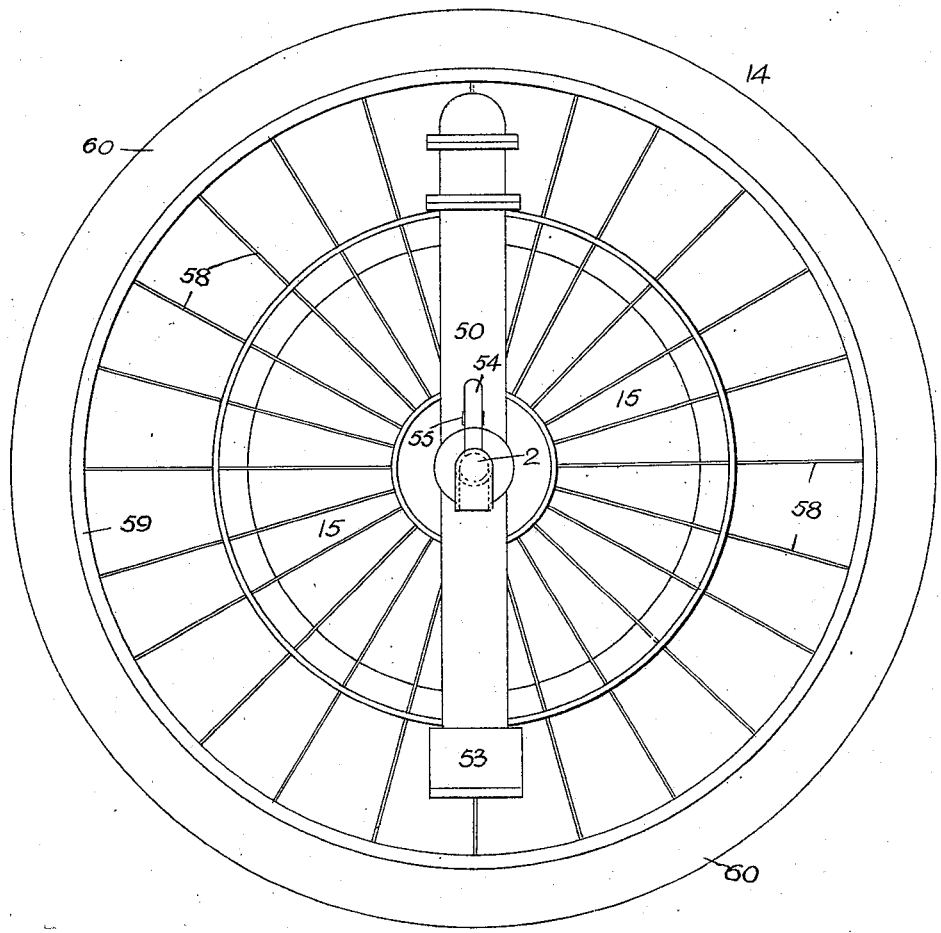
Fig. IX.
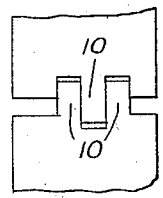
Fig. X.
Witnesses,
John T. Fazakarley.
Thos. H. Wilson.
Inventor,
Thomas Deakin.
per.
Douglas Leechman.
Attorney.

UNITED STATES PATENT OFFICE.

THOMAS DEAKIN, OF ECCLES, ENGLAND, ASSIGNOR TO HIMSELF AND CHARLES HERBERT DEAKIN, OF MONTON, ECCLES, ENGLAND.

ENGINE.

SPECIFICATION forming part of Letters Patent No. 708,697, dated September 9, 1902.

Application filed December 5, 1901. Serial No. 84,771. (No model.)

*To all whom it may concern:*

Be it known that I, THOMAS DEAKIN, a subject of the King of Great Britain, residing at Monton, Eccles, in the county of Lancaster, England, have invented a new and useful Engine, of which the following is a specification.

My invention relates to a steam, compressed-air, or other fluid-pressure high-speed engine which may be adapted to a great variety of purposes and shall be cheap to manufacture, light in weight, compact, economical in consumption and maintenance, variable in speed, readily reversible, and easily installed and started; and my invention consists, essentially, in an engine or motor comprising a series of inwardly-directed cylinders arranged radially relatively to a fly-wheel and adapted to rotate therewith, the pistons acting upon the periphery of an elliptical or otherwise suitably formed track or tracks arranged around the shaft of the engine, such shaft being stationary, hollow, and provided with suitable ports for the admission of steam or the like to and its exhaust from the cylinders.

In the accompanying drawings, Figure I is an elevation, partly in longitudinal vertical section, of an engine constructed according to my invention. Fig. II is an elevation, partly in transverse vertical section, of the said engine. Figs. III and IV are similar views to Figs. I and II of a triple-expansion engine. Fig. V is a transverse section through the valves, showing the same reversed as compared with Fig. IV. Fig. VI is an elevation of an eccentric track for a two or more cylinder engine. Fig. VII is an elevation showing two tracks for an eight-cylindered quadruple-expansion engine. Figs. VIII and IX are an end elevation and side elevation, respectively, of a motor road-wheel. Fig. X shows a detail in plan.

The same numerals refer to the same parts throughout the drawings.

Figs. I and II show a simple steam-engine constructed according to my invention. I provide a hollow shaft 2, preferably built up of two similar parts, having flanges 3 3 on their adjacent ends and hexagon or other suitable non-circular peripheries at their other ends 4. The two parts 2 2 may be connected by bolting (5) together the flanges 3 3, the peripheries of which form a track 6 of elliptical form. The said track is preferably provided with lateral guides 7. The shaft 2 as a whole is held in position and prevented from rotating by locking its non-circular ends $4^3$ 4 4 in standards 8, rising from a base-plate 9 or the like. Live steam is admitted at the end 10 of the shaft and passes out therefrom through a radial port 11. The exhaust returns into the shaft through another radial port 12 and may escape through the other end 13 of the shaft or be otherwise disposed of. Concentrically with the said shaft 2 is mounted a fly-wheel 14, constructed with one or more webs or spokes 15. Such webs or spokes are preferably arranged laterally and are hereinafter referred to as and included in the term "walls." Inside the wheel are provided a suitable number—say six—of radial cylinders 16. The inner ends of the cylinders are preferably open, and the outer ends are closed, except for the admission and exhaust ports 25 26, hereinafter referred to. The wheel 14, together with the cylinders 16, may be divided—say at or about the central plane—into two parts to allow of its being located in position with its walls 15 on either side of the track 6. The parts of the wheel may be firmly connected together by transverse bolts 17 or other suitable means. Each wall 15 of the wheel is provided with a concentric boss, forming a trunnion 18, which may work in suitable bearings 19 in fixed pedestals 20, so that the valve-faces 27 may be relieved of the weight of the wheel 14 and the parts rotating therewith. In each cylinder 16 is arranged a piston 21, and each piston carries a roller 22 or the like, adapted to run around the track 6. An endless steel band 23 or a chain or the like may be fitted around all the rollers 22 to hold them up to the track 6 against the centrifugal force when the steam is exhausted. Radial steam-passages 24 are provided in the walls 15 of the wheel 14 and are adapted to communicate between the ports 11 12 in the hollow shaft 2 and the ports 25 26, leading to and from the closed ends of the cylinders 16.

The action is as follows: On steam being admitted to the hollow shaft 2 it passes through one or more of the ports 11 therein and the radial passage 24 for the time being opposite thereto, through the ports 25 to the outer end of the cylinder or cylinders 16, whose piston-rollers 22 are in engagement with parts of the track 6 of greater diameter. The expansion of the steam forces the pistons 21 inward and causes the rollers 22 to travel toward parts of the track 6 of less diameter. The movement of the rollers 22 on the track 6 is necessarily accompanied by a rotary movement of the pistons 21, cylinders 16, and wheel 14 about the axis of the shaft 2. The rotation of the wheel carries the radial passages 24 out of communication with the admission-ports 11 on the shaft 2 and in due time—say on completion of the determined expansion—brings the said passages into communication with the exhaust-ports 12 in the shaft, when the steam escapes through the ports 26, 12, and 13. With an elliptical track there are two admission-ports 11 11 and two exhaust-ports 12 12 serving each cylinder in the shaft, as shown. With an eccentric track there need be only one admission-port 11 and one exhaust-port 12, as shown in Fig. VI.

An engine constructed as above described would serve where the work to be done could be satisfactorily accomplished with a constant cut-off and without reversing. To provide for varying the cut-off and reversing, I employ the construction shown in Figs. III, IV, and V. In this case I provide the shaft 2 with two sleeves 28 29, the outer ends of which may project beyond the trunnions 18. Suitable means are provided for causing the two parts of each sleeve to rotate together, as by mutually-engaging fingers 30, Fig. X, projecting through slots 31, cut in the flanges 3. The slots 31 are made long enough to allow of the sleeves 28 29 rotating through suitable angles relatively to the shaft 2. Levers 32 33 may be applied to the sleeves 28 29 for the purpose of rotating the same. The sleeves are provided with glands 56 and with shoulders 34 35, coöperating with shoulders 36 on the shaft 2 to make steam-tight joints. The parts of the sleeves 28 29 opposite to the ports 11 12 in the shaft 2 are provided with apertures 38 39 and 40 41, respectively, of suitable area, so that by turning the said sleeve 28 on the shaft the lead and cut-off may be adjusted, and by turning the sleeve 29 the quantity of steam admitted may be regulated and the direction of rotation may be reversed as required. The apertured parts of the sleeve 28 may be formed somewhat taper and the wheel be provided with renewable bushes 41' of corresponding taper, as shown. The action is similar to that above described with reference to Figs. I and II; but the active steam is of course led from cylinder to cylinder through suitable passages 57 before being exhausted. Double, quadruple, or other expansion may be employed in a similar manner by making the various cylinders and pistons of suitable dimensions and by arranging the steam passages and ports so that the live steam enters and expands in each cylinder in turn before finally exhausting. Exhaust-chambers may be arranged between the various cylinders.

In some cases two or more tracks may be employed. For example, Fig. VII shows a quadruple-expansion engine with eight cylinders 16, four of the pistons 21 being adapted to act upon one track 6 and the other four pistons upon another independent track 6', the major axes of the two tracks being arranged in planes at ninety degrees or other suitable angle to each other to avoid dead-centers.

Motion may be taken from the periphery 42 of the wheel 14 or from pulleys attached to the walls thereof, or one of the bosses 18 of the wheel may project beyond one end of the shaft 2 and form a hollow spindle to which a pulley 44 or the like may be coupled, as shown in Fig. III. In this case only one end of the shaft 2 is directly locked, the pedestal at the other end forming a bearing 45 for the projected boss. The said boss and bearing are provided with apertures 46 47 for the escape of the exhaust.

The rotating engine-wheel may form a complete driving road-wheel; but I prefer to employ it as a hub, to which suitable spokes 58, rim 59, and tire 60 are secured. Figs. VIII and IX show such a wheel as constructed for use in a motor-bicycle. The hollow shaft 2 forms the axis of the wheel. There are preferably two boilers 50, arranged one at each side of the wheel 14, being mounted on the ends of the shaft 2, with the valve-sleeve-regulating arm 32 arranged outside. A sprocket-wheel 51 for pedal-chain driving may be mounted on one of the said bosses. Water and fuel tanks 52 53 may be arranged between the boilers 50 and wheel 14. Steam is led from the said boilers through suitable pipes 54, provided with a stop-valve 55, to the hollow shaft 2, and the action of the engine is as before described. The exhaust may be turned into the boiler smoke-box and act as a blast, or it may be led to a suitable condenser.

The above-described engines may be adapted to work with compressed air or the like instead of steam, in which case, of course, the boilers will be replaced by suitable reservoirs. The construction lends itself to ready balancing of the parts, so that vibration is reduced to a minimum; but the running-surface of the track may be mounted elastically, if desired. The wheel, cylinders, and pistons have a fly-wheel effect while the engine is working and promote steadiness of running under variations of load. The pistons may be adapted to hold oil or any suitable means provided for introducing the lubricant.

What I claim, and desire to secure by Letters Patent of the United States, is—

1. In an engine, the combination of a stationary hollow shaft, a non-circular track arranged around the said shaft, admission-ports and exhaust-ports in the said shaft, a wheel rotatable around the said shaft and having steam-passages in its walls, a number of inwardly-directed cylinders carried by the said wheel and having admission-ports and exhaust-ports in communication with the said steam-passages, pistons adapted to reciprocate in the said cylinders, and rollers carried by the said pistons and adapted to make contact with the said track, substantially as and for the purpose set forth.

2. In an engine, the combination of a hollow shaft having non-circular ends, standards adapted to hold the said shaft by its non-circular ends, a non-circular track arranged around the said shaft, admission-ports and exhaust-ports in the said shaft, a wheel rotatable around the said shaft, and having radial steam-passages in its walls, trunnions on the said wheel, pedestals, bearings mounted in the said pedestals and adapted to carry the said trunnions, a number of inwardly-directed cylinders carried by the said wheel and having admission-ports and exhaust-ports in communication with the said steam-passages, pistons adapted to reciprocate in the said cylinders, and rollers carried by the said pistons and adapted to make contact with the said track, substantially as and for the purpose set forth.

3. In an engine, the combination of a stationary hollow shaft, a non-circular track arranged around the said shaft, admission-ports and exhaust-ports in the said shaft, a wheel rotatable around the said shaft, and having steam-passages in its walls, a number of inwardly-directed cylinders carried by the said wheel and having admission-ports and exhaust-ports in communication with the said steam-passages, pistons adapted to reciprocate in the said cylinders, and a rotatable sleeve introduced between the said shaft and the said wheel and having apertures therein, substantially as and for the purpose set forth.

4. In an engine, the combination of a stationary hollow shaft, a non-circular track arranged around the said shaft, admission-ports and exhaust-ports in the said shaft, a wheel rotatable around the said shaft, and having steam-passages in its walls, a number of inwardly-directed cylinders carried by the said wheel and having admission-ports and exhaust-ports in communication with the said steam-passages, pistons adapted to reciprocate in the said cylinders, and two concentric rotatable sleeves introduced between the said shaft and the said wheel and having apertures therein, substantially as and for the purpose set forth.

5. In an engine, the combination of a stationary hollow shaft, a non-circular track arranged around the said shaft, admission-ports and exhaust-ports in the said shaft, a wheel rotatable around the said shaft, and having radial steam-passages in its walls or otherwise, compounding, inwardly-directed cylinders carried by the said wheel, circumferential steam-passages communicating between the said cylinders, admission-ports and exhaust-ports communicating with between said cylinders and the said radial passages, and pistons adapted to reciprocate in the said cylinders around the said track or tracks, substantially as and for the purpose set forth.

6. In an engine, the combination of a stationary hollow shaft, a non-circular track arranged around the said shaft, admission-ports and exhaust-ports in the said shaft, a wheel rotatable around the said shaft, and having steam-passages in its walls or otherwise, a number of inwardly-directed cylinders carried by the said wheel and having admission-ports and exhaust-ports in communication with the said steam-passages, pistons adapted to reciprocate in the said cylinders, a rim, and spokes connecting the said rim with the said wheel, substantially as set forth.

7. In an engine, the combination of a stationary hollow shaft, a non-circular track arranged around the said shaft, admission-ports and exhaust-ports in the said shaft, a wheel rotatable around the said shaft and having steam-passages in its walls or otherwise, a number of inwardly-directed cylinders carried by the said wheel and having admission-ports and exhaust-ports in communication with the said steam-passages, pistons adapted to reciprocate in the said cylinders, a rim, spokes connecting the said rim with the said wheel, and a tire carried by the said rim, substantially as and for the purpose set forth.

8. In an engine, the combination of a stationary hollow shaft, a plurality of non-circular tracks arranged around the said shaft, admission-ports and exhaust-ports in the said shaft, a wheel rotatable around the said shaft, a number of inwardly-directed cylinders carried by the said wheel, and pistons adapted to reciprocate in the said cylinders some around each track, substantially as and for the purpose set forth.

9. In an engine, the combination of a hollow shaft having non-circular ends, standards adapted to hold the said shaft by its non-circular ends, a non-circular track arranged around the said shaft, admission-ports and exhaust-ports in the said shaft, a wheel rotatable around the said shaft and having radial steam-passages in its walls or otherwise, trunnions on the said wheel, pedestals, bearings mounted in the said pedestals and adapted to carry the said trunnions, compounding inwardly-directed cylinders carried by the said wheel, circumferential steam-passages communicating between the said cylinders, admission-ports and exhaust-ports communicating between the said cylinders and the said radial passages, pistons adapted to reciprocate in the said cylinders, rollers carried by the said pistons and adapted to make contact with the said track, means for retaining the said rollers in contact with the said track, two concentric rotatable sleeves introduced between the said shaft and the said wheel and having apertures therein, and means for transmitting motion from the said wheel, substantially as and for the purpose set forth.

In testimony whereof I have signed my name to this specification in the presence of two subscribing witnesses.

THOMAS DEAKIN.

Witnesses:
ELDEN ALFRED KING,
VERNON HOWE.